United States Patent
Sakamoto et al.

(10) Patent No.: US 6,809,136 B2
(45) Date of Patent: Oct. 26, 2004

(54) ROOM TEMPERATURE CURABLE ORGANOPOLYSILOXANE COMPOSITIONS

(75) Inventors: Takafumi Sakamoto, Usui-gun (JP); Norio Kameda, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/608,365

(22) Filed: Jun. 30, 2003

(65) Prior Publication Data

US 2004/0002571 A1 Jan. 1, 2004

(30) Foreign Application Priority Data

Jul. 1, 2002 (JP) ........................................ 2002-191694

(51) Int. Cl.[7] .............................................. C08L 83/00
(52) U.S. Cl. ........................ 524/266; 524/268; 525/477; 528/17; 528/34
(58) Field of Search ................................ 524/266, 268; 525/477; 528/17, 34

(56) References Cited

U.S. PATENT DOCUMENTS 3,676,420 A * 7/1972 Fulton et al. .................. 528/18
4,652,624 A   3/1987 Allen et al.
5,936,032 A * 8/1999 Angus, Jr. .................. 524/863

FOREIGN PATENT DOCUMENTS

| JP | 39-27643    |   | 12/1964 |           |
|----|-------------|---|---------|-----------|
| JP | 55-43119    |   | 3/1980  |           |
| JP | 61021157 A  | * | 1/1986  | C08L/83/06 |
| JP | 62-207369   |   | 9/1987  |           |
| JP | 7-39547     |   | 5/1995  |           |

* cited by examiner

Primary Examiner—Margaret G. Moore
Assistant Examiner—Marc Zimmer
(74) Attorney, Agent, or Firm—Oblon, Spivak, McClelland, Maier & Neustadt, P.C.

(57) ABSTRACT

A room temperature curable organopolysiloxane composition comprising (A) 100 pbw of an organopolysiloxane having at least two organooxysilyl groups in a molecule, (B) 1–30 pbw of a hydroxyl-terminated linear organopolysiloxane, (C) 0.5–15 pbw of an organooxysilane or a partial hydrolytic condensate thereof, and (D) 0.1–10 pbw of a titanium chelate catalyst is stable during storage under sealed conditions and fully adherent to those resins which are difficult to bond.

3 Claims, No Drawings

ROOM TEMPERATURE CURABLE ORGANOPOLYSILOXANE COMPOSITIONS

This invention relates to room temperature curable organopolysiloxane compositions, and more particularly, to room temperature curable organopolysiloxane compositions which are adherent to difficult-to-bond resins used as sealants or for bonding and securing of electric and electronic parts.

BACKGROUND OF THE INVENTION

Various types of room temperature curable organopolysiloxane compositions are well known in the art which cure into elastomers at room temperature upon contact with air-borne moisture. Among others, those compositions of the type that cure while releasing alcohol are preferentially used in sealing, bonding and coating of electric and electronic equipment, owing to their advantageous features of no disgusting odor and no corrosion of metals. One typical composition of this type is described in JP-B 39-27643 as comprising an organopolysiloxane end-blocked with hydroxyl groups, an alkoxysilane, and an organic titanium compound. Also JP-A 55-43119 discloses a composition comprising an organopolysiloxane end-blocked with alkoxysilyl groups, an alkoxysilane, and alkoxy titanium. JP-B 7-39547 discloses a composition comprising an organopolysiloxane end-blocked with alkoxysilyl groups (including silethylene), an alkoxysilane, and alkoxy titanium. JP-A 62-207369 discloses a composition comprising an alkoxysilyl end-capped organopolysiloxane, a hydroxyl-terminated organopolysiloxane, an alkoxysilane and titanium. Allegedly improvements are made in resistance to oil swelling and shelf life. For these compositions of the type that cure while releasing alcohol, engineers have made efforts to improve the preparation method, shelf stability (suppression of changes with time) and various properties, typically resistance to oil swelling. Although the above-referred compositions appear analogous, the individually specified composition has an important meaning in positively acquiring the desired set of properties.

Meanwhile, with the sophistication of techniques of improving the durability of resins, many of the resins currently used in housings of electric and electronic appliances are not bondable with conventional sealants. The above-referred compositions used for sealing, bonding and coating in electric and electronic equipment are not fully adherent to these resins.

SUMMARY OF THE INVENTION

An object of the invention is to provide a room temperature curable organopolysiloxane composition which is fully adherent to difficult-to-bond resins used as sealants or for bonding and securing of electric and electronic parts. We have found that by using an organopolysiloxane having at least two organooxysilyl groups in a molecule as a base polymer, and adding thereto specific amounts of a hydroxyl end-capped organopolysiloxane, an organooxysilane or partial hydrolytic condensate thereof, and a titanium chelate catalyst, there is obtained an organopolysiloxane composition which has shelf stability and is dramatically improved in adhesion to those resins which are believed to be difficult to bond. The present invention is predicated on this finding.

Accordingly, the present invention provides a room temperature curable organopolysiloxane composition comprising components (A) to (D):

(A) 100 parts by weight of an organopolysiloxane having at least two organooxysilyl groups in a molecule, represented by the following general formula (1) or average formula (2) or (3):

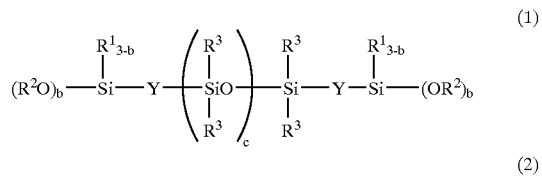

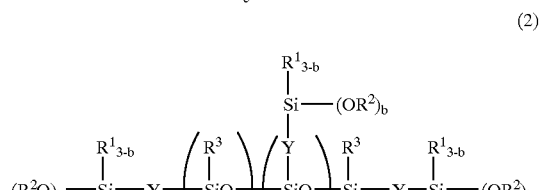

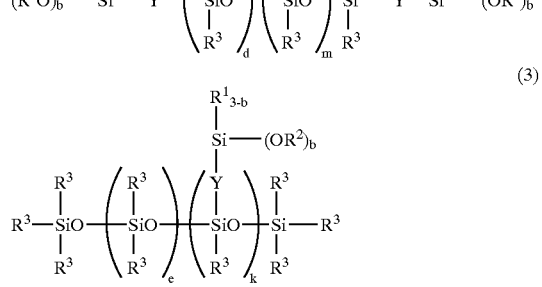

wherein $R^1$ is a monovalent hydrocarbon group, $R^2$ is a monovalent hydrocarbon group or alkoxy-substituted monovalent hydrocarbon group, $R^3$ is a substituted or unsubstituted monovalent hydrocarbon group, Y is an oxygen atom or divalent hydrocarbon group having 1 to 8 carbon atoms, b is an integer of 1 to 3, c, d, e and m each are an integer of at least 1, k is an integer of at least 2, and c, d+m and e+k in the formulae are each such an integer that the organopolysiloxane has a viscosity of 20 to 1,000,000 centipoises at 25° C., (B) 1 to 30 parts by weight of a hydroxyl-terminated linear organopolysiloxane having the following general formula (4):

wherein $R^3$ is substituted or unsubstituted monovalent hydrocarbon group and f is such an integer that the organopolysiloxane has a viscosity of 20 to 1,000,000 centipoises at 25° C., (C) 0.5 to 15 parts by weight of an organooxysilane having the general formula: $R^1{}_a Si(OR^2)_{4-a}$ wherein $R^1$ is a monovalent hydrocarbon group, $R^2$ is a monovalent hydrocarbon group or alkoxy-substituted monovalent hydrocarbon group, and "a" is 0 or 1, or a partial hydrolytic condensate thereof, and (D) 0.1 to 10 parts by weight of a titanium chelate catalyst.

DESCRIPTION OF THE PREFERRED EMBODIMENT

The room temperature curable organopolysiloxane composition is arrived at by using as a base polymer an organopolysiloxane having per molecule at least two silicon atoms each attached to an organooxy group through an oxygen atom or divalent hydrocarbon group and compounding therewith specific amounts of a hydroxyl end-capped organopolysiloxane, an organooxysilane or partial hydrolytic condensate thereof, and a titanium chelate compound as a catalyst.

Component (A), which serves as a base polymer of the inventive composition, is an organopolysiloxane having per molecule at least two, preferably 2 to 10 silicon atoms each attached to an organooxy group, especially alkoxy group through an oxygen atom or divalent hydrocarbon group. Namely, component (A) is one or more organooxysilyl group-containing organopolysiloxanes having the following general formula (1), average formula (2) and average formula (3). It is noted that the average formula means that siloxane units having pendant alkoxy groups may be discretely dispersed rather than being blocked together.

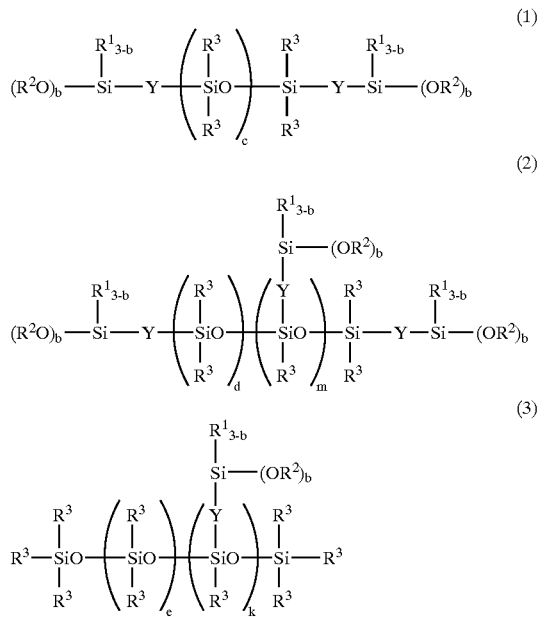

Herein $R^1$ is a monovalent hydrocarbon group, $R^2$ is a monovalent hydrocarbon group or an alkoxy-substituted monovalent hydrocarbon group, $R^3$ is a substituted or unsubstituted monovalent hydrocarbon group, Y is an oxygen atom or divalent hydrocarbon group having 1 to 8 carbon atoms, b is an integer of 1 to 3, c, d, e and m each are an integer of at least 1, k is an integer of at least 2, and c, d+m and e+k in the formulae are each such an integer that the organopolysiloxane has a viscosity of 20 to 1,000,000 centipoises at 25° C.

In the organopolysiloxanes of the general formula (1) or the average formula (2) or (3), the monovalent hydrocarbon groups represented by $R^1$ and $R^3$ are preferably unsubstituted or substituted (halogen, cyano or otherwise substituted) monovalent hydrocarbon groups having 1 to 12 carbon atoms, especially 1 to 10 carbon atoms, for example, alkyl groups such as methyl, ethyl, propyl, butyl, hexyl, octyl, decyl, and octadecyl, cycloalkyl groups such as cyclopentyl and cyclohexyl, alkenyl groups such as vinyl and allyl, aryl groups such as phenyl, tolyl and naphthyl, and aralkyl groups such as benzyl, phenylethyl and phenylpropyl. Exemplary of halogenated hydrocarbon groups are chloromethyl, trifluoromethyl, chloropropyl, 3,3,3-trifluoropropyl, chlorophenyl, dibromophenyl, tetrachlorophenyl, and difluorophenyl. Exemplary of cyanoalkyl groups are β-cyanoethyl, γ-cyanopropyl and β-cyanopropyl. Of these, methyl is most preferred.

For $R^2$, hydrocarbon groups of 1 to 10 carbon atoms, especially 1 to 4 carbon atoms are preferred. Examples of suitable monovalent hydrocarbon groups are as described above. Typical examples include alkyl groups such as methyl, ethyl, propyl, butyl, hexyl and octyl, and alkoxy-substituted alkyl groups such as methoxyethyl, ethoxyethyl, methoxypropyl and methoxybutyl. Of these, methyl and ethyl are most preferred.

Desirably, each of $R^1$, $R^2$ and $R^3$ has 1 to 3 carbon atoms, and is most desirably methyl.

Y is an oxygen atom or a divalent hydrocarbon group. Suitable divalent hydrocarbon groups are alkylene groups having 1 to 8 carbon atoms, especially 1 to 6 carbon atoms, such as $-CH_2CH_2-$, $-CH_2CH_2CH_2-$ and $-CH_2C(CH_3)H-$, with $-CH_2CH_2-$ being most preferred.

The subscripts b, m and k are as defined above, b is preferably 2 or 3, m is preferably 1 to 10, more preferably 1 to 5, most preferably 1 to 3, and k is preferably 2 to 10, more preferably 2 to 6, most preferably 2 to 4. If values of m and k are too large, the cured product may have insufficient rubber elasticity.

The organopolysiloxane (A) should have a viscosity of 20 to 1,000,000 centipoises at 25° C. With a viscosity of less than 20 cp, the elastomer as cured may not have satisfactory physical properties, especially flexibility and elongation. With a viscosity of more than 1,000,000 cp, the composition may have too high a viscosity to apply. The preferred viscosity is in the range of 100 to 500,000 cp. Accordingly, n, d+m and e+k are selected such that the viscosity of the organopolysiloxane may fall in the desired range.

The organopolysiloxane (A) containing per molecule at least two organooxysilyl groups attached to silicon atoms through an oxygen atom or divalent hydrocarbon group can be prepared by prior art well-known methods. For example, the organopolysiloxane (A) is prepared by effecting addition reaction between a corresponding alkenyl group-terminated organopolysiloxane and an organooxysilane having the following formula (6):

wherein $R^1$, $R^2$ and b are as defined above in the presence of a Pt catalyst. Alternatively, addition reaction is effected between a corresponding SiH-terminated organopolysiloxane and a silane of the following formula (7):

wherein $R^4$ is an alkenyl group, $R^1$, $R^2$ and b are as defined above.

Component (B) is crucial for imparting resin adhesiveness as intended in the present invention. It is a linear organopolysiloxane having a hydroxyl group at an end, represented by the following general formula (4):

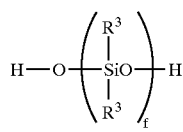
(4)

wherein $R^3$ is substituted or unsubstituted monovalent hydrocarbon group and f is such an integer that the organopolysiloxane has a viscosity of 20 to 1,000,000 centipoises at 25° C.

In formula (4), $R^3$ is as exemplified for $R^3$ in component (A). The organopolysiloxane (B) should have a viscosity at 25° C. of 20 to 1,000,000 centipoises, preferably 100 to 500,000 centipoises. With too low a viscosity, the organopolysiloxane (B) imparts insufficient adhesion. With too high a viscosity, the composition becomes awkward to process.

Component (B) is added in an amount of 1 to 30 parts by weight, preferably 5 to 20 parts by weight per 100 parts by weight of component (A). With too much component (B), the composition has poor shelf stability or changes with time. Too small amounts of component (B) fail to impart adhesion to difficult-to-bond resins.

Component (C) serves as a crosslinker for helping the composition cure into a rubber elastomer. It is an organooxysilane having the following general formula or a partial hydrolytic condensate thereof.

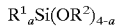
$R^1{}_aSi(OR^2)_{4-a}$

Herein $R^1$ is a monovalent hydrocarbon group, $R^2$ is a monovalent hydrocarbon group or alkoxy-substituted monovalent hydrocarbon group, and "a" is 0 or 1.

Examples of the monovalent hydrocarbon group or alkoxy-substituted monovalent hydrocarbon group represented by $R^1$ and $R^2$ are the same as illustrated above for component (A).

Illustrative examples of the organooxysilane (C) include tetrafunctional alkoxysilanes such as tetramethoxysilane, tetraethoxysilane and methylcellosolve orthosilicate; trifunctional alkoxysilanes such as methyltrimethoxysilane, methyltriethoxysilane, ethyltrimethoxysilane, vinyltrimethoxysilane, phenyltrimethoxysilane and methyltrimethoxyethoxysilane, and partial hydrolytic condensates thereof. These organooxysilanes may be used alone or in admixture of any. In order to impart low modulus to rubber elastomers after curing, difunctional alkoxysilanes such as diphenyldimethoxysilane and dimethyldimethoxysilane may be additionally added.

Component (C) is generally added in amounts of 0.5 to 15 parts by weight, preferably 1 to 10 parts by weight, per 100 parts by weight of component (A). With too small amounts of component (C), the composition may not fully cure and tends to thicken and gel during storage in a cartridge. Too large amounts of component (C) may retard curing, provide unsatisfactory rubber physical properties and be uneconomical.

Component (D) is a catalyst for the inventive composition to cure. Exemplary catalysts include organotitanium compounds such as tetraisopropoxytitanium, tetra-t-butoxytitanium, titanium diisopropoxide bis(ethyl acetoacetate), and titanium diisopropoxide bis(acetylacetonate); organotin compounds such as dibutyltin dilaurate, dibutyltin bisacetylacetonate and tin octylate; metal salts of dicarboxylic acids such as lead dioctylate; organozirconium compounds such as zirconium tetraacetylacetonate; organoaluminum compounds such as aluminum triacetylacetonate; and amines such as hydroxylamine and tributylamine. Of these, organotitanium compounds are preferred. Titanium chelate catalysts are most preferred for enhancing the storage stability of the inventive composition. Typical titanium chelate catalysts are of the general formulae (8) and (9).

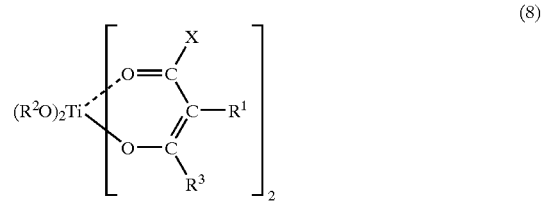
(8)

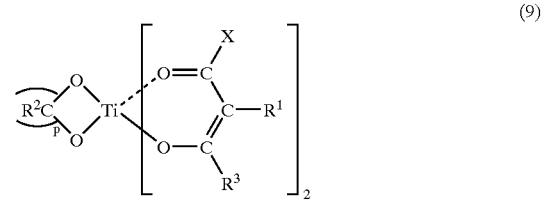
(9)

Herein, X is a monovalent hydrocarbon group, alkoxy or amino group, $R^1$, $R^2$ and $R^3$ are as defined above, and p is an integer of 1 to 8.

The monovalent hydrocarbon groups represented by X are exemplified by monovalent hydrocarbon groups of 1 to 12 carbon atoms, especially 1 to 10 carbon atoms, as described above for $R^1$ and $R^3$. Preferred alkoxy groups are those of 1 to 8 carbon atoms, especially 1 to 6 carbon atoms. $R^1$ and $R^3$, taken together, may form a ring having 5 to 8 carbon atoms in total with the C=C to which they are attached.

Illustrative examples of titanium chelate catalysts (D) include titanium diisopropoxide bis(ethyl acetoacetate), titanium diisopropoxide bis(acetylacetone), titanium dibutoxide bis(methyl acetoacetate), and those of the formulae shown below.

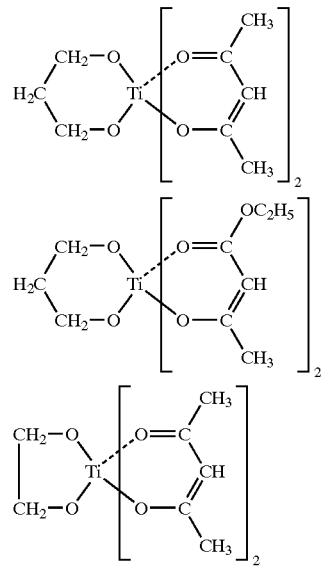

-continued

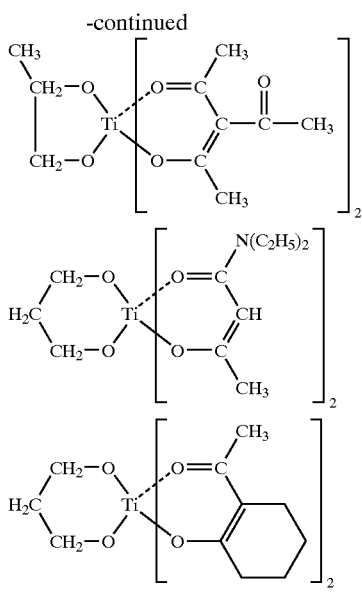

Component (D) is generally added in catalytic amounts, preferably amounts of 0.1 to 10 parts by weight, preferably 0.2 to 7 parts by weight, per 100 parts by weight of component (A). With too small amounts of component (D), the composition will slowly cure. With too large amounts of component (D), the composition will cure too fast and become unstable during storage.

In the inventive composition, (E) a trimethylsiloxy-terminated linear organopolysiloxane having the following general formula (5) is preferably compounded for the purpose of controlling the fluidity of the composition prior to curing or adjusting the modulus of the rubber elastomer after curing.

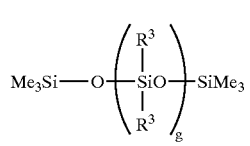

(5)

Herein $R^3$ is substituted or unsubstituted monovalent hydrocarbon group, g is such an integer that the organopolysiloxane has a viscosity of 20 to 1,000,000 centipoises at 25° C., and Me is methyl.

Examples of the substituted or unsubstituted monovalent hydrocarbon group represented by $R^3$ are the same as exemplified for $R^3$ in component (A).

The organopolysiloxane (E) has a viscosity of 20 to 1,000,000 centipoises at 25° C. With a viscosity of less than 20 cp, the cured elastomer may not be endowed with satisfactory physical properties, especially flexibility and elongation. With a viscosity of more than 1,000,000 cp, the composition may have too high a viscosity, substantially detracting from efficiency upon application. The preferred viscosity is in the range of 100 to 500,000 cp. Therefore, g is selected such that the viscosity may fall in the desired range.

Component (E) is added in an amount of 1 to 50 parts by weight, preferably 5 to 40 parts by weight per 100 parts by weight of component (A). Too small amounts may fail to provide the addition effect whereas too large amounts may have negative impact on the impartment of adhesion.

In a preferred embodiment of the invention, the composition further includes (F) fumed silica. It is a component for reinforcement, i.e., increasing the mechanical strength of cured rubber elastomers.

The fumed silica should preferably have a BET specific surface area of at least 10 $m^2/g$, and more preferably 50 to 400 $m^2/g$, and be added in amounts of 1 to 40 parts by weight, preferably 2 to 30 parts by weight, per 100 parts by weight of component (A).

The fumed silica may be either hydrophobic silica or hydrophilic silica, which may be used alone or in combination. The hydrophobic silicas are typically ones treated with organosilicon compounds having dialkylsilyl or trialkylsilyl groups. Most preferably, silica is treated with hexamethyldisilazane or the like so that trimethylsilyl groups are bound to silica surfaces although surface treatment with dimethyldichlorosilane, cyclic dimethylsiloxane, hydroxyl-containing dimethyloligosiloxane or the like is acceptable. A mixture of two or more hydrophobic silicas is also useful.

In the inventive composition comprising components (A) to (F) described above, a fine powder inorganic filler may optionally be added for the purposes of improving flow characteristics prior to curing and endowing the cured rubber elastomer with desired mechanical properties. Examples of the inorganic filler include quartz flour, calcium carbonate, fumed titanium dioxide, diatomaceous earth, aluminum hydroxide, microparticulate alumina, magnesia, zinc oxide and zinc carbonate, which may be surface treated with silanes, silazanes, low degree-of-polymerization siloxanes, and organic compounds.

Furthermore, organic solvents, mildew-proofing agents, flame retardants, heat resistance modifiers, plasticizers, thixotropic agents, adhesion promoters, curing promoters, pigments and the like may be added to the inventive composition as long as they do not compromise the objects of the invention.

The inventive composition may be prepared by mixing components (A) to (F) and optional additives under humidity-shielded conditions. The composition thus obtained is stored in a sealed container, typically cartridge and on use, exposed to air-borne moisture whereupon it cures into a rubbery elastomer. That is, the inventive composition can be used as one part type RTV organopolysiloxane composition.

The organopolysiloxane composition of the invention is fully adherent to difficult-to-bond resins which are used as sealants or for bonding and securing of electric and electronic parts.

On account of improved water resistance and moisture resistance, the inventive composition is compatible with many applications including coating materials requiring water resistance, such as ship bottom paint, power plant seawater inlet pipe paint, and fishing net paint; moisture-proof coating materials requiring moisture resistance as used in LCD and PDP; and adhesive seals between conductors and resin coatings, adhesive seals between conductors and resin casings or resin connectors, and adhesive seals for reduced or increased pressure chambers.

In building applications requiring moisture resistance and water resistance, the inventive composition is useful as adhesive seals between rubber gaskets and glazing, joint seals for double-glazed units, adhesive seals at joints and edges of water-proof sheets, adhesive seals between solar water heating units and roof water-proof sheets, adhesive seals between solar battery panels and roofing, and face bonds between siding panels and walls.

The inventive composition is also applicable as adhesive seals between window glass or transparent resin plates and frames of meters and other instruments.

EXAMPLE

Examples of the invention are given below by way of illustration and not by way of limitation. All parts are by weight. Viscosity is a measurement in centipoise (cp) at 25° C.

Synthesis Example 1

To 100 parts of α,ω-dimethylvinyl-dimethylpolysiloxane having a viscosity of 30,000 cp were added 7 parts of trimethoxysilane and 1 part of a 1% isopropanol solution of chloroplatinic acid as the catalyst. In a $N_2$ gas stream, they were mixed at 80° C. for 8 hours. The mixture was then heated at 50° C. under a vacuum of 10 mmHg, distilling off the excess trimethoxysilane.

The polymer thus obtained had a viscosity of 30,500 cp. When the polymer was mixed with tetrabutyl titanate in a ratio of 100:1, it did not thicken immediately and cured after one day. This suggests that trimethoxysilane added to vinyl groups at ends of the polymer. This polymer is designated Polymer A and has the average formula shown below.

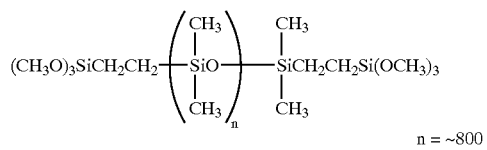

n = ~800

Synthesis Example 2

To 100 parts of α,ω-dimethylhydroxy-dimethylpolysiloxane having a viscosity of 20,000 cp were added 10 parts of tetramethoxysilane and 0.1 part of isopropylamine as the catalyst. In a $N_2$ gas stream, they were mixed at 100° C. for 6 hours. The mixture was then heated at 50° C. under a vacuum of 10 mmHg, distilling off the excess tetramethoxysilane.

The polymer thus obtained had a viscosity of 21,000 cp. When the polymer was mixed with tetrabutyl titanate in a ratio of 100:1, it did not thicken immediately and cured after one day. This suggests that trimethoxysilyl groups substituted at ends of the polymer. This polymer is designated Polymer B and has the average formula shown below.

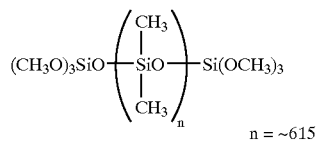

n = ~615

Synthesis Example 3

To 100 parts of dimethylvinyl-terminated dimethylpolysiloxane containing one vinyl group at a side chain and vinyl groups at both ends and having a viscosity of 30,000 cp were added 7 parts of trimethoxysilane and 1 part of a 1% isopropanol solution of chloroplatinic acid as the catalyst. In a $N_2$ gas stream, they were mixed at 80° C. for 8 hours. The mixture was then heated at 50° C. under a vacuum of 10 mmHg, distilling off the excess trimethoxysilane.

The polymer thus obtained had a viscosity of 31,000 cp. When the polymer was mixed with tetrabutyl titanate in a ratio of 100:1, it did not thicken immediately and cured after one day. This suggests that trimethoxysilane added to the vinyl groups at ends and side chain of the polymer. This polymer is designated Polymer C and has the average formula shown below.

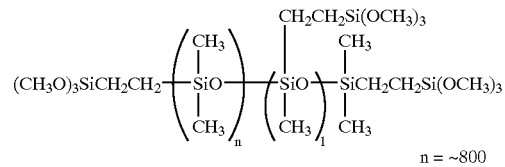

n = ~800

Synthesis Example 4

To 100 parts of dimethylvinyl-terminated dimethylpolysiloxane containing three vinyl groups at side chains and vinyl groups at both ends and having a viscosity of 29,000 cp were added 15 parts of trimethoxysilane and 1 part of a 1% isopropanol solution of chloroplatinic acid as the catalyst. In a $N_2$ gas stream, they were mixed at 80° C. for 8 hours. The mixture was then heated at 50° C. under a vacuum of 10 mmHg, distilling off the excess trimethoxysilane.

The polymer thus obtained had a viscosity of 31,500 cp. When the polymer was mixed with tetrabutyl titanate in a ratio of 100:1, it did not thicken immediately and cured after one day. This suggests that trimethoxysilane added to the vinyl groups at ends and side chains of the polymer. This polymer is designated Polymer D and has the average formula shown below.

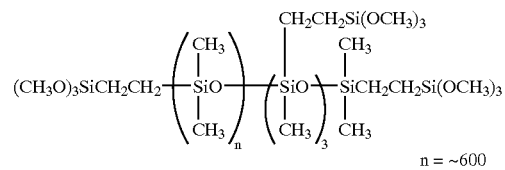

n = ~600

Example 1

A composition was prepared by uniformly mixing 65 parts of Polymer A, 5 parts of α,ω-dimethylhydroxy-dimethylpolysiloxane having a viscosity of 700 cp, and 5 parts of fumed silica having a specific surface area of 130 $m^2/g$, followed by heating and mixing in vacuum at 150° C. for 2 hours. The mixture was then mixed in vacuum with 4 parts of vinyltrimethoxysilane and 2 parts of titanium diisopropoxide bis(ethyl acetoacetate) until uniform. This was further mixed in vacuum with 1 part of γ-glycidoxypropyltrimethoxysilane until uniform. The composition was contained in a plastic cartridge, which was sealed.

Example 2

A composition was prepared as in Example 1 aside from using Polymer B instead of Polymer A.

Example 3

A composition was prepared as in Example 1 aside from further adding 10 parts of α,ω-dimethylsiloxy-dimethylpolysiloxane having a viscosity of 300 cp.

Example 4

A composition was prepared as in Example 1 aside from using Polymer C instead of Polymer A.

Example 5

A composition was prepared as in Example 1 aside from using Polymer D instead of Polymer A.

Comparative Example 1

A composition was prepared as in Example 1 aside from omitting 5 parts of α,ω-dimethylhydroxy-dimethylpolysiloxane having a viscosity of 700 cp.

Comparative Example 2

A composition was prepared as in Example 2 aside from increasing the amount of α,ω-dimethylhydroxy-dimethylpolysiloxane having a viscosity of 700 cp to 65 parts.

Comparative Example 3

A composition was prepared as in Example 1 aside from using 65 parts of α,ω-dimethylhydroxy-dimethylpolysiloxane having a viscosity of 700 cp instead of Polymer A.

The compositions thus obtained were evaluated for rubber physical properties and adhesion by the tests described below. Shelf stability was evaluated by the following test. The results are shown in Tables 1 and 2.

Rubber Physical Properties:

The composition was worked into a sheet of 2 mm thick and cured in an atmosphere of 23° C. and RH 50% for 7 days. Physical properties (hardness, tensile strength and elongation at break) of the rubber sheet were measured according to JIS K-6249.

Adhesion:

The composition was coated to substrates of polyphenylene sulfide (PPS) and polybutylene terephthalate (PBT) over an area of 25×10 mm and to a thickness of 2 mm and cured in an atmosphere of 23° C. and RH 50% for 7 days. The adhesive strength was measured by pulling the cured coating in a shear direction.

Shelf Stability:

The uncured compositions of Examples and Comparative Examples in cartridges were heat aged in a dryer at 70° C. for 7 days. Like the fresh compositions, the aged compositions were subjected to the rubber physical properties test and the adhesion test.

TABLE 1

|  | Measurement | Example 1 | Example 2 | Example 3 | Example 4 | Example 5 |
|---|---|---|---|---|---|---|
| Fresh | Hardness, Durometer A | 28 | 28 | 23 | 32 | 27 |
|  | Elongation at break, % | 200 | 220 | 230 | 170 | 120 |
|  | Tensile strength, MPa | 1.3 | 1.2 | 1.0 | 1.5 | 1.1 |
|  | Adhesion to PPS, MPa | 0.8 | 0.7 | 0.6 | 0.9 | 0.7 |
|  | Adhesion to PBT, MPa | 0.9 | 0.8 | 0.7 | 1.0 | 0.7 |
| Aged | Hardness, Durometer A | 27 | 28 | 22 | 32 | 26 |
|  | Elongation at break, % | 120 | 210 | 240 | 190 | 1200 |
|  | Tensile strength, MPa | 1.3 | 1.3 | 1.1 | 1.5 | 1.0 |
|  | Adhesion to PPS, MPa | 0.8 | 0.8 | 0.7 | 1.0 | 0.6 |
|  | Adhesion to PBT, MPa | 0.9 | 0.8 | 0.7 | 1.0 | 0.7 |

TABLE 2

|  | Measurement | Comparative Example 1 | Comparative Example 2 | Comparative Example 3 |
|---|---|---|---|---|
| Fresh | Hardness, Durometer A | 27 | 28 | 35 |
|  | Elongation at break, % | 210 | 240 | 100 |
|  | Tensile strength, MPa | 1.3 | 1.0 | 1.0 |
|  | Adhesion to PPS, MPa | 0.1 | 0.3 | peeled |
|  | Adhesion to PBT, MPa | peeled | 0.3 | peeled |
| Aged | Hardness, Durometer A | 26 | 10 | 28 |
|  | Elongation at break, % | 200 | 360 | 120 |
|  | Tensile strength, MPa | 1.3 | 0.1 | 0.8 |
|  | Adhesion to PPS, MPa | peeled | peeled | peeled |
|  | Adhesion to PBT, MPa | peeled | peeled | peeled |

As compared with prior art one-part alcohol-removal type RTV organopolysiloxane compositions, the RTV organopolysiloxane composition of the invention is stable during storage under sealed conditions and fully adherent to those resins which are difficult to bond, such as PPS and PBT.

Japanese Patent Application No. 2002-191694 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A room temperature curable organopolysiloxane composition comprising (A) 100 parts by weight of an organopolysiloxane having at least two organooxysilyl groups in a molecule, represented by the following general formula (1) or average formula (2) or (3):

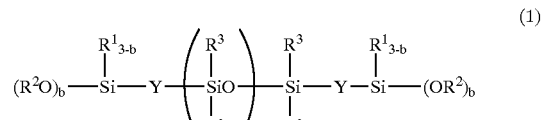

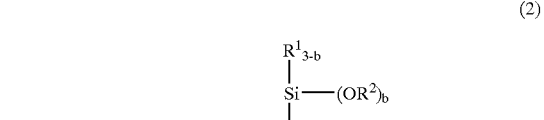

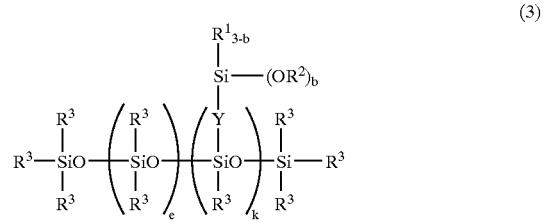

wherein $R^1$ is a monovalent hydrocarbon group, $R^2$ is a monovalent hydrocarbon group or alkoxy-substituted monovalent hydrocarbon group, $R^3$ is a substituted or unsubstituted monovalent hydrocarbon group, Y is an oxygen atom or divalent hydrocarbon group having 1 to 8 carbon atoms, b is an integer of 1 to 3, c, d, e and m each are an integer of at least 1, k is an integer of at least 2, and c, d+m and e+k in the formulae are each such an integer that the organopolysiloxane has a viscosity of 20 to 1,000,000 centipoises at 25° C., (B) 1 to 30 parts by weight of a hydroxyl-terminated linear organopolysiloxane having the following general formula (4):

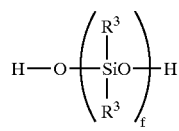

(4)

wherein $R^3$ is substituted or unsubstituted monovalent hydrocarbon group and f is such an integer that the organopolysiloxane has a viscosity of 20 to 1,000,000 centipoises at 25° C., (C) 0.5 to 15 parts by weight of an organooxysilane having the general formula: $R^1{}_a Si(OR^2)_{4-a}$ wherein $R^1$ is a monovalent hydrocarbon group, $R^2$ is a monovalent hydrocarbon group or alkoxy-substituted monovalent hydrocarbon group, and "a" is 0 or 1, or a partial hydrolytic condensate thereof, and (D) 0.1 to 10 parts by weight of a titanium chelate catalyst.

2. The composition of claim 1, further comprising (E) 1 to 50 parts by weight of a trimethylsiloxy-terminated linear organopolysiloxane having the following general formula (5):

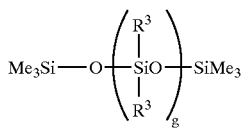

(5)

wherein $R^3$ is substituted or unsubstituted monovalent hydrocarbon group, g is such an integer that the organopolysiloxane has a viscosity of 20 to 1,000,000 centipoises at 25° C., and Me is methyl.

3. The composition of claim 1, further comprising (F) 1 to 40 parts by weight of fumed silica.

* * * * *